(12) United States Patent
Norton et al.

(10) Patent No.: US 8,677,241 B2
(45) Date of Patent: Mar. 18, 2014

(54) METHOD AND SYSTEM FOR MULTIMEDIA MESSAGING SERVICE (MMS) TO VIDEO ADAPTATION

(75) Inventors: Richard Elliott Norton, Ste-Genevieve (CA); Francis Roger Labonte, Sherbrooke (CA); Mario Joseph Leo Claude Lavalliere, Mascouche (CA)

(73) Assignee: Vantrix Corporation, Montreal (CA)

( * ) Notice: Subject to any disclaimer, the term of this patent is extended or adjusted under 35 U.S.C. 154(b) by 1010 days.

(21) Appl. No.: 12/118,690

(22) Filed: May 10, 2008

(65) Prior Publication Data

US 2009/0067357 A1 Mar. 12, 2009

Related U.S. Application Data

(60) Provisional application No. 60/971,111, filed on Sep. 10, 2007.

(51) Int. Cl.
*G06F 3/00* (2006.01)
(52) U.S. Cl.
USPC .......................................................... 715/723
(58) Field of Classification Search
USPC .......................................................... 715/723
See application file for complete search history.

(56) References Cited

U.S. PATENT DOCUMENTS

| | | | |
|---|---|---|---|
| 5,978,370 A | 11/1999 | Shively | |
| 6,289,358 B1 | 9/2001 | Mattis et al. | |
| 6,470,378 B1 | 10/2002 | Tracton et al. | |
| 6,483,851 B1 | 11/2002 | Neogi | |
| 6,563,517 B1 | 5/2003 | Bhagwat et al. | |
| 6,785,732 B1 | 8/2004 | Bates et al. | |
| 6,813,690 B1 | 11/2004 | Lango | |
| 6,888,477 B2 | 5/2005 | Lai et al. | |
| 6,970,602 B1 | 11/2005 | Smith | |
| 7,010,581 B2 | 3/2006 | Brown | |
| 7,076,544 B2 | 7/2006 | Katz et al. | |
| 7,409,464 B2 | 8/2008 | Jansson | |
| 7,475,106 B2 | 1/2009 | Agnoli | |
| 7,549,052 B2 | 6/2009 | Haitsma | |
| 7,577,848 B2 | 8/2009 | Schwartz | |

(Continued)

FOREIGN PATENT DOCUMENTS

| | | |
|---|---|---|
| EP | 1001582 A2 | 5/2000 |
| EP | 1460848 A2 | 9/2004 |

(Continued)

OTHER PUBLICATIONS

Coskun, Bads, Sankur, Bulent "Robust Video Hash Extraction" article available at <citeseerx.ist.psu.edu/viewdoc/download?doi=10.1.1.113.9934.pdf> European Signal Processing Conference WUSIPCO 2004.

(Continued)

*Primary Examiner* — William Bashore
*Assistant Examiner* — Hien Duong
(74) *Attorney, Agent, or Firm* — Victoria Donnelly; IP-MEX Inc.

(57) ABSTRACT

A method and system are disclosed for adapting the media contained in a multimedia messaging service (MMS) message, which may include a presentation, into a single media format such as an audio/video file or stream by creating a logical timeline from information found in the presentation, creating an adaptation pipeline from the logical timeline, and executing the adaptation pipeline.

27 Claims, 9 Drawing Sheets

(56) References Cited

U.S. PATENT DOCUMENTS

| | | | |
|---|---|---|---|
| 7,640,274 | B2 | 12/2009 | Tinker |
| 7,692,666 | B1 | 4/2010 | Bourgoin et al. |
| 7,831,900 | B2 | 11/2010 | Lee |
| 7,876,766 | B1 | 1/2011 | Atkins et al. |
| 7,890,619 | B2 | 2/2011 | Morota et al. |
| 2002/0103972 | A1 | 8/2002 | Satran |
| 2003/0097564 | A1 | 5/2003 | Tewari |
| 2004/0001106 | A1 | 1/2004 | Deutscher |
| 2004/0024897 | A1 | 2/2004 | Ladd et al. |
| 2004/0032348 | A1 | 2/2004 | Lai et al. |
| 2004/0111476 | A1 | 6/2004 | Trossen et al. |
| 2004/0181550 | A1 | 9/2004 | Warsta et al. |
| 2004/0268224 | A1 | 12/2004 | Balkus |
| 2005/0187756 | A1* | 8/2005 | Montgomery et al. ............ 704/9 |
| 2006/0010226 | A1 | 1/2006 | Hurtta et al. |
| 2006/0029192 | A1 | 2/2006 | Duddley et al. |
| 2006/0095452 | A1* | 5/2006 | Jansson et al. ................ 707/101 |
| 2006/0156218 | A1* | 7/2006 | Lee ............................ 715/500.1 |
| 2006/0161538 | A1 | 7/2006 | Kiilerich |
| 2006/0242550 | A1* | 10/2006 | Rahman et al. ............ 715/500.1 |
| 2007/0011256 | A1* | 1/2007 | Klein ........................... 709/206 |
| 2007/0067390 | A1 | 3/2007 | Agnoli et al. |
| 2007/0150877 | A1 | 6/2007 | Emmett et al. |
| 2007/0204318 | A1 | 8/2007 | Ganesh |
| 2007/0216761 | A1* | 9/2007 | Gronner et al. ............ 348/14.02 |
| 2008/0001791 | A1 | 1/2008 | Wanigasekara-Mohotti et al. |
| 2008/0091840 | A1 | 4/2008 | Guo et al. |
| 2008/0140720 | A1 | 6/2008 | Six et al. |
| 2008/0196076 | A1 | 8/2008 | Shatz et al. |
| 2008/0201386 | A1 | 8/2008 | Maharajh et al. |
| 2008/0226173 | A1 | 9/2008 | Yuan |
| 2008/0229429 | A1 | 9/2008 | Krig |
| 2009/0067357 | A1 | 3/2009 | Norton |
| 2009/0083279 | A1 | 3/2009 | Hasek |
| 2009/0088191 | A1 | 4/2009 | Norton |
| 2009/0125677 | A1 | 5/2009 | Levesque |
| 2009/0193485 | A1 | 7/2009 | Rieger et al. |
| 2009/0280844 | A1 | 11/2009 | Norton |
| 2010/0094817 | A1 | 4/2010 | Ben-Shaul et al. |
| 2010/0114816 | A1 | 5/2010 | Kiilerich |
| 2010/0153495 | A1 | 6/2010 | Barger |
| 2010/0281112 | A1 | 11/2010 | Plamondon |
| 2010/0318632 | A1 | 12/2010 | Yoo et al. |
| 2011/0106822 | A1 | 5/2011 | Golwalkar et al. |
| 2011/0131298 | A1 | 6/2011 | Courtemanche |
| 2011/0161409 | A1 | 6/2011 | Nair et al. |

FOREIGN PATENT DOCUMENTS

| | | |
|---|---|---|
| EP | 1482735 | 12/2004 |
| JP | 09325413 | 12/1997 |
| JP | 2001-117809 | 4/2001 |
| JP | 2002108870 | 12/2002 |
| JP | 2003143575 | 5/2003 |
| JP | 2003337739 | 11/2003 |
| JP | 2007-158687 | 6/2007 |
| WO | 02052730 | 7/2002 |
| WO | 03040893 | 5/2003 |
| WO | WO2004097688 | 11/2004 |
| WO | WO2006/023302 | 3/2006 |
| WO | 2007037726 | 4/2007 |
| WO | WO2007037726 A1 | 4/2007 |
| WO | WO2012-088023 A2 | 6/2012 |

OTHER PUBLICATIONS

OMA Multimedia Messaging Service, Architecture Overview, Approved Version 1.2 Mar. 1, 2005, published by Open Mobile Alliance, available from http://www.openmobilealliance.org/release_program/mms_v1_2.html.

Open Mobile Alliance document OMA-AD-STI-V1_0-20270515-A "Architecture of the Environment using the Standard Transcoding Interface" Approved Version 1.0—May 15, 2007, published by Open Mobile Alliance.

3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

Synchronized Multimedia Integration Language (SMIL) 1.0 Specification, published by W3C organization at http://www.w3.org/TR/REC-smil Jun. 15, 1998.

Nokia Multimedia Messaging Service Center, External Application Interface, Frequently Asked Questions, Reference for External Application Interface (EAIF) protocol available at http://www.forum.nokia.com/info/sw.nokia.com/id/d0ee4125-3879-4482-b55d-90e3afe17a31/Ext_App_Interface_FAQ.pdf.html published by Nokia, prior to Sep. 9, 2007.

Tayeb Lemlouma, Nabil Layaida "Encoding Multimedia Presentations for User Preferences and Limited Environments" Proceedings of IEEE International Conference on Maultimedia & Expo (ICME), IEEE Computer Society, 2003, p. 165-168.

International Search Report and Written Opinion rendered by Canadian Intellectual Property Office, dated Sep. 30, 2008.

Relational Database System (RDBS), available from http://www.mysql.org/ published by Sun Microsystems, available prior to Nov. 12, 2007.

Request for Comments (RFC)1321 "The MD5 Message-Digest Algorithm", R. Revest, available from http://tools.ietf.org/html/rfc1321 published by IEFT (Internet Engineering Task Force) Apr. 1992.

MM1, MM3, MM4, MM7 are defined by the 3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

"Internet Content Adaptation Protocol (ICAP)" J. Elson, Request for Comments (RFC) 3597 available from http://www.ietf.org/rfc/rfc3507.txt, Apr. 2003.

JPEG—Wikipedia, the free encyclopedia, http://en.wikipedia.org/wiki/JPEG, Aug. 5, 2007.

Advanced Audio Coding—Wikipedia, the free encyclopedia, http://en.wikipedia.org/wiki/Advanced_Audio_Coding, Aug. 5, 2010.

Multimedia Messaging Service, Media formats and codecs 3GPP TS 26.140, V 7.1.0, http:// www.3gpp.org/ftp/specs/html-info/26140.htm, Jun. 2007.

Synchronized Media Integration Language (SMIL) 2.0 Specification W3C Recommendation http://www.w3.org/TR/smil20/, Aug. 7, 2001.

"The independent JPEG Group" ftp.uu.net/graphics/jpeg/jpegsrc.v6b.tar.gz, Aug. 3, 2007.

"Multimedia Adaptation for the Multimedia Messaging Service" Stephane Coulombe and Guido Grassel, IEEE Communication Magazine, vol. 42, No. 7, p. 120-126, Jul. 2004.

International Search Report and Written Opinion by the Canadian Intellectual Property Office dated Apr. 20, 2009 for PCT/CA2008/002286.

Matthijs Douze, Herv'e J'Egou and Cordelia Schmid, "An Image-Based Approach to Video Copy Detection with Spatio-Temporal Post-Filtering" IEEE Transactions on Multimedia, No. 4, pp. 257-266, available on the Internet at http://lear.inrialpes.fr/pubs/2010/DJS!)/douze_tmm.pdf, Jun. 2010.

Xing Su, Tiejun Huang, Wen Gao, "Robust Video Fingerprinting Based on Visual Attention Regions", IEEE International Conference on Acoustics Speech and Signal Processing, available on internet at http://www.jdi.ac.cn/doc/2009/ROBUST%20VIDEO%20FINGERPRINTING%20ON%20BASED%20ON%20VISUAL%20ATTENTION%20REGIONS.pdf, Apr. 19-24, 2009.

S. Coulombe et al, Multimedia Adaptation for the Multimedia Messaging Service, IEEE Communication Magazine, vol. 42, No. 7, p. 120-126, Jul. 2004.

3GPP TS 26.140 V7.1.0, Technical Specification, 3rd Generation Partnership Project; Technical Specification Group Services and System Aspects; Multimedia Messaging Service (MMS); Media formats and codecs (Release 7) available from http://www.3gpp.org/ftp/Specs/html-info/26140.htm, Jun. 6, 2007.

* cited by examiner

208

```
01 <smil>
02 <head>
03 <layout>
04 <root-layout width="240" height="320"/>
05 <region id="Image" width="100%" height="70%" left="0%" top="0%" fit="fill" />
06 <region id="Text" width="100%" height="30%" left="0%" top="70%" fit="fill"/>
07 </layout>
08 </head>
09 <body>
10 <par dur="8000ms">
11 <video src="video1.3gp region="Image" begin="0ms" end="8000ms"/>
12 </par>
13 <par dur="6000ms">
14 <audio src="audio1.aac" begin="0ms end="6000ms"/>
15 <img src="image1.jpg" region="Image" begin="0ms end="3000ms"/>
16 <text src="text1.txt" region="Text"  begin="3000ms end="6000ms"/>
17 </par>
18 </body>
19 </smil>
```

SMIL code of the example presentation

METHOD AND SYSTEM FOR MULTIMEDIA MESSAGING SERVICE (MMS) TO VIDEO ADAPTATION

RELATED APPLICATION

The present application claims benefit to the U.S. provisional application Ser. No. 60/971,111 filed on Sep. 10, 2007 entitled "MULTIMEDIA MESSAGING SERVICE (MMS) TO VIDEO ADAPTATION", which is incorporated herein by reference.

FIELD OF THE INVENTION

The present invention relates to multimedia messaging service (MMS) and more specifically to the adaptation of media contained in a MMS message into a single media.

BACKGROUND OF THE INVENTION

The multimedia messaging service (MMS) as described, e.g., in the OMA Multimedia Messaging Service specification, Approved Version 1.2 May 2005, Open Mobile Alliance, OMA-ERP-MMS-V1_2-20050429-A.zip, which is available at the following URL http://www.openmobilealliance-.org/Technical/release_program/mms_v1_2.aspx, provides methods for the peer-to-peer and server-to-client transmission of various types of data including text, audio, still images, and moving images, primarily over wireless networks.

While the MMS provides standard methods for encapsulating such data, the type of data may be coded in any of a large number of standard formats such as plain text, 3GP video and audio/speech, SP-MIDI for synthetic audio, JPEG still images (for details on any one of those refer to Multimedia Messaging Service, Media formats and codecs, 3GPP TS 26.140, V7.1.0 (2007-06), available at the following URL http://www.3gpp.org/ftp/Specs/html-info/26140.htm).

FIG. 1 illustrates one example of a MMS system architecture 100, including an Originating Node 102, a Service Delivery Platform 104, a Destination Node 106, and an Adaptation Engine 108. The Originating Node 102 is able to communicate with the Service Delivery Platform 104 over a Network "A" 110. Similarly the Destination Node 106 is able to communicate with the Service Delivery Platform 104 over a Network "B" 112. The Networks "A" and "B" are merely examples, shown to illustrate a possible set of connectivity, and many other configurations are also possible. For example, the Originating and Destination Nodes (102 and 106) may be able to communicate with the Service Delivery Platform 104 over a single network; the Originating Node 102 may be directly connected to the Service Delivery Platform 104 without an intervening network, etc.

The Adaptation Engine 108 may be directly connected with the Service Delivery Platform 104 over a link 114 as shown in FIG. 1, or alternatively may be connected to it through a network, or may be embedded in the Service Delivery Platform 104.

In a trivial case, the Originating Node 102 may send a (multimedia) message that is destined for the Destination Node 106. The message is forwarded through the Network "A" 110 to the Service Delivery Platform 104 from which the message is sent to the Destination Node 106 via the Network "B" 112. The Originating and Destination Nodes (102 and 106) may for instance be wireless devices, the Networks "A" and "B" (110 and 112) may in this case be wireless networks, and the Service Delivery Platform 104 may provide the multimedia message forwarding service.

In another instance, the Originating Node 102 may be a server of a content provider, connected to the Service Delivery Platform 104 through a data network, i.e. the Network "A" 110 may be the internet, while the Network "B" 112 may be a wireless network serving the Destination Node 106 which may be a wireless device.

In a more general case, the capabilities of the Destination Node 106 may not include the ability to receive, decode, or display the message in the form in which it was sent from the Originating Node 102. In order for the Destination Node 106 to handle the message, the message received from the Originating Node 102 may be modified in the Adaptation Engine 108 before being delivered to the Destination Node 106.

A "Standard Coding Interface" proposed by the "Open Mobile Alliance" provides a framework for standardizing an approach to message adaptation for the MMS as described in Open Mobile Alliance document OMA-AD-STI-V1_0-20070515-A "Architecture of the Environment using the Standard Transcoding Interface", which is available at the following URL http://www.openmobilealliance.org/Technical/release_program/sti_v10.aspx.

In the example configuration of FIG. 1, transmission of a message from the Originating Node 102 to the Destination Node 106 would involve the following five steps, assuming that message adaptation is required:

Step 1:
   a "source message" is sent from the Originating Node 102 to the Service Delivery Platform 104;

Step 2:
   the Service Delivery Platform 104 determines the capabilities of the Destination Node 106, for example by interrogating the Destination Node 106 directly or by consulting a database of capabilities;

Step 3:
   the Service Delivery Platform 104 sends a request to the Adaptation Engine 108, the request including the original "source message", and a description of the capabilities of the Destination Node 106;

Step 4:
   the Adaptation Engine 108 performs the adaptation of the "source message" into an "adapted message"; and Step 5:
   the Adaptation Engine 108 returns the "adapted message" to the Service Delivery Platform 104 which forwards it to the Destination Node 106.

While the "Standard Coding Interface", described in the OMA Multimedia Messaging Service specification, Approved Version 1.2 May 2005 cited above provides a framework for transcoding messages that are destined to wireless devices, there remains a requirement for developing an adaptation engine with adaptation methods for specific types of destination nodes or services.

SUMMARY OF THE INVENTION

It is therefore an object of the invention to provide an improved method and system for multimedia messaging service (MMS) to video adaptation, which would avoid or mitigate the drawbacks of the prior art.

According to one aspect of the invention, there is provided a method for adapting a multimedia message, comprising a presentation and a plurality of input media, into an output single media, the method including the steps of:
(a) parsing the presentation;
(b) creating a logical timeline of the plurality of input media from the parsed presentation;
(c) creating an adaptation pipeline from the logical timeline; and
(d) creating the output single media by executing the adaptation pipeline.

The step (a) includes breaking down the presentation into components representing times and durations of each of the plurality of input media.

The step (b) includes the steps of:
(i) determining a start time and duration of each of the input media;
(ii) identifying the presence of any text media in the plurality of input media;
(iii) inserting all input media except the text media into the logical timeline; and
(iv) inserting the text media into the logical timeline after the step (iii).

The step (c) comprises creating a sequence of individual adaptation instruction steps in the form of an adaptation pipeline following the order of the logical timeline. Preferably, the individual adaptation instruction steps include defining operations to be performed in the order of the logical timeline, the operations leading to the output single media. The step (d) comprises executing the individual adaptation instruction steps upon the input media resulting in the output single media.

Conveniently, each individual adaptation instruction step comprises:
defining one or more input media for transcoding;
defining a transcoding operation for the one or more input media using a set of transcoding parameters; and
defining a respective destination output media for the result of the transcoding operation.

In the embodiment of the invention, the respective destination output media is the output single media. Conveniently, the step (d) includes merging the respective destination output media into the output single media.

In the embodiments of the invention, the multimedia message is a multimedia messaging service (MMS) message.

In the method described above, the output single media is one of the following:
an audio file;
a video file including a video stream; or
a combined audio and video file including audio and video streams.

Alternatively, the output single media may be one of the following:
an audio stream;
a video stream; or
a combined audio and video stream.

In the method described above, the step (d) comprises converting a text media of the plurality of input media into a graphical representation, and wherein the step (d) further comprises overlaying the graphical representation over the video stream of the video file or the combined audio and video file respectively.

Similarly, the step (d) may comprise converting an image media of the plurality of input media into a video representation, and inserting the video representation into the video stream of the video file or the combined audio and video file respectively.

According to another aspect of the invention, there is provided a method for adapting a plurality of input media contained in a multimedia messaging service (MMS) message including a presentation, into an output single media, the method including steps of:
(a) parsing the presentation;
(b) creating a logical time line from the parsed presentation;
(c) creating an adaptation pipe line from the logical time line; and
(d) executing the adaptation pipe line to generate the output single media.

The step (a) includes breaking down the presentation into components representing times and durations of each of the plurality of input media.

The step (b) includes the steps of:
(i) determining a start time and duration of each input media;
(ii) identifying the presence of any text media in the plurality of input media;
(iii) inserting all input media except the text media into the logical timeline; and
(iv) inserting the text media into the logical timeline after the step (iii).

The step (c) comprises creating a sequence of individual adaptation instruction steps in the form of an adaptation pipeline following the order of the logical timeline.

The individual adaptation instruction steps include defining operations to be performed in the order of the logical timeline, the operations leading to the output single media.

The step (d) comprises executing the individual adaptation instruction steps upon the input media resulting in the output single media.

According to another aspect of the invention, there is provided a media adaptation system for adapting a multimedia message including a plurality of input media, into a single output media, the system comprising:
a parser module for parsing a presentation of the multimedia message;
a timelining module for creating a logical timeline of the input media from the parsed presentation;
a pipelining module for creating an adaptation pipeline from the logical timeline; and
a pipeline execution module for creating the output single media by executing the adaptation pipeline.

The parser module includes means for breaking down the presentation into components representing times and durations of each of the input media of the multimedia message.

The timelining module includes means for:
(i) determining a start time and duration of each input media;
(ii) identifying the presence of any text media in the plurality of input media;
(iii) inserting all input media except the text media into the logical timeline; and
(iv) inserting the text media into the logical timeline.

The pipelining module comprises means for creating a sequence of individual adaptation instruction steps in the form of an adaptation pipeline following the order of the logical timeline.

The pipeline execution module comprises means for executing the individual adaptation instruction steps upon the input media resulting in the output single media.

A computer readable medium, comprising computer code instructions stored thereon for performing the steps of the method described above is also provided.

BRIEF DESCRIPTION OF THE DRAWINGS

Embodiments of the invention will now be described, by way of example, with reference to the accompanying drawings, in which:

FIG. 3 shows a SMIL code segment that would correspond to the presentation 208 of the MMS message 202;

DETAILED DESCRIPTION OF THE EMBODIMENTS OF THE INVENTION

The invention is concerned with the processing of MMS messages and the "media" contained in an MMS message. A single media is a block of data that represents information that is intended to be read, heard, or viewed. Because the term "media" is often applied more broadly, the term "single media" will be used in the present description, to designate a media (block of data) that does not contain other single media:
- a text single media format can only contain text;
- an image single media format can only contain one or more a still or animated images (s);
- an audio/video single media format can (typically) only contain audio/video;
- an audio single media format can only contain an audio clip (here we mean audio, speech and synthetic audio).

From this point on, animated images are considered to be equivalent to video. Still images are considered as images.

Briefly stated, it is an objective of the invention to adapt an input MMS message that may contain media such as audio clips, video clips, still or animated images, and text, into a single output audio/video media. The adapted single audio/video media may subsequently be delivered to a destination in any specified format or encapsulation.

The terms "media" and (more specifically) "single media" will be used to describe a distinct component or block of data in an MMS message. Thus a block which is coded to provide moving images with sound may be termed a audio/video media, a block coded to provide a still or animated image (s) may be termed an image media, and a block of text may be termed a text media. The MMS message as a whole may thus be considered to be a "container media" which encapsulates one or more "single media".

The single media blocks contained in an MMS message are stored sequentially. An MMS message may optionally contain a special type of media called a "media presentation" or simply "presentation". The purpose of the presentation is to represent the relationship between the other single media blocks contained in the message, in terms of sequencing, ordering and timing of the presentation of the single media to which it refers. In other words, the presentation represents when and for how long each single media is presented in relationship to the other ones inside the MMS.

Figure 2:
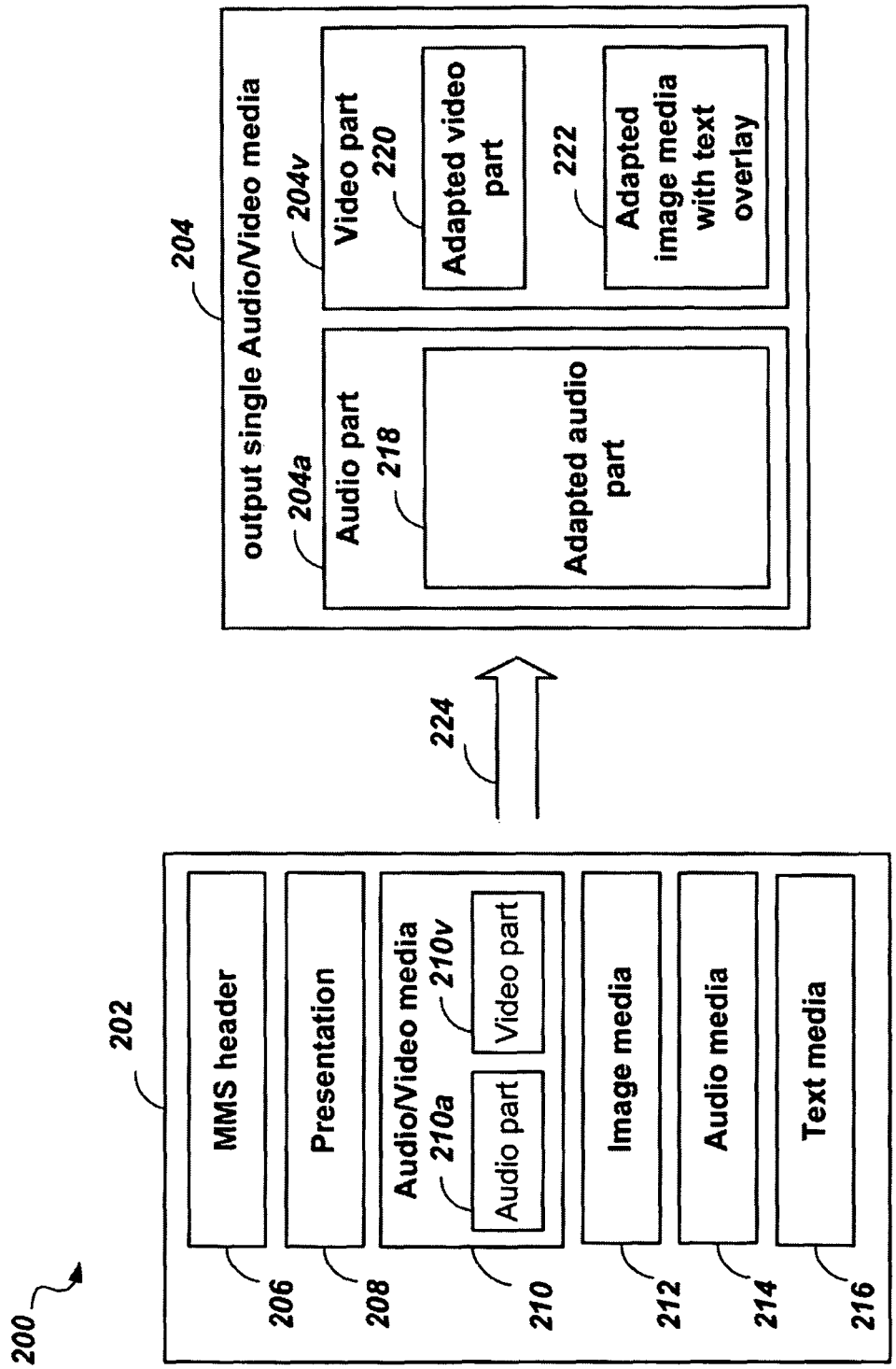
FIG. 2 shows a block diagram 200 illustrating media adaptation of an example input MMS message 202 into a single output audio/video media 204, including an adaptation method 224, according to an embodiment of the invention.

FIG. 2 shows a block diagram 200 illustrating media adaptation of an example input MMS message 202 into a single output audio/video media 204, according to an embodiment of the invention.

The input MMS message 202 comprises an "MMS header" 206, a "presentation" 208, an "audio/video media" 210 including an audio part 210a and a video part 210v, an "image media" 212, an "audio media" 214, and a "text media" 216.

The single output audio/video media 204 comprises an audio part 204a and a video part 204v.

The audio part 204a of the single output audio/video media 204 includes an adapted audio part 218. The video part 204v of the single output audio/video media 204 includes an adapted video part 220 and an adapted image media with text overlay.

Figure 1:
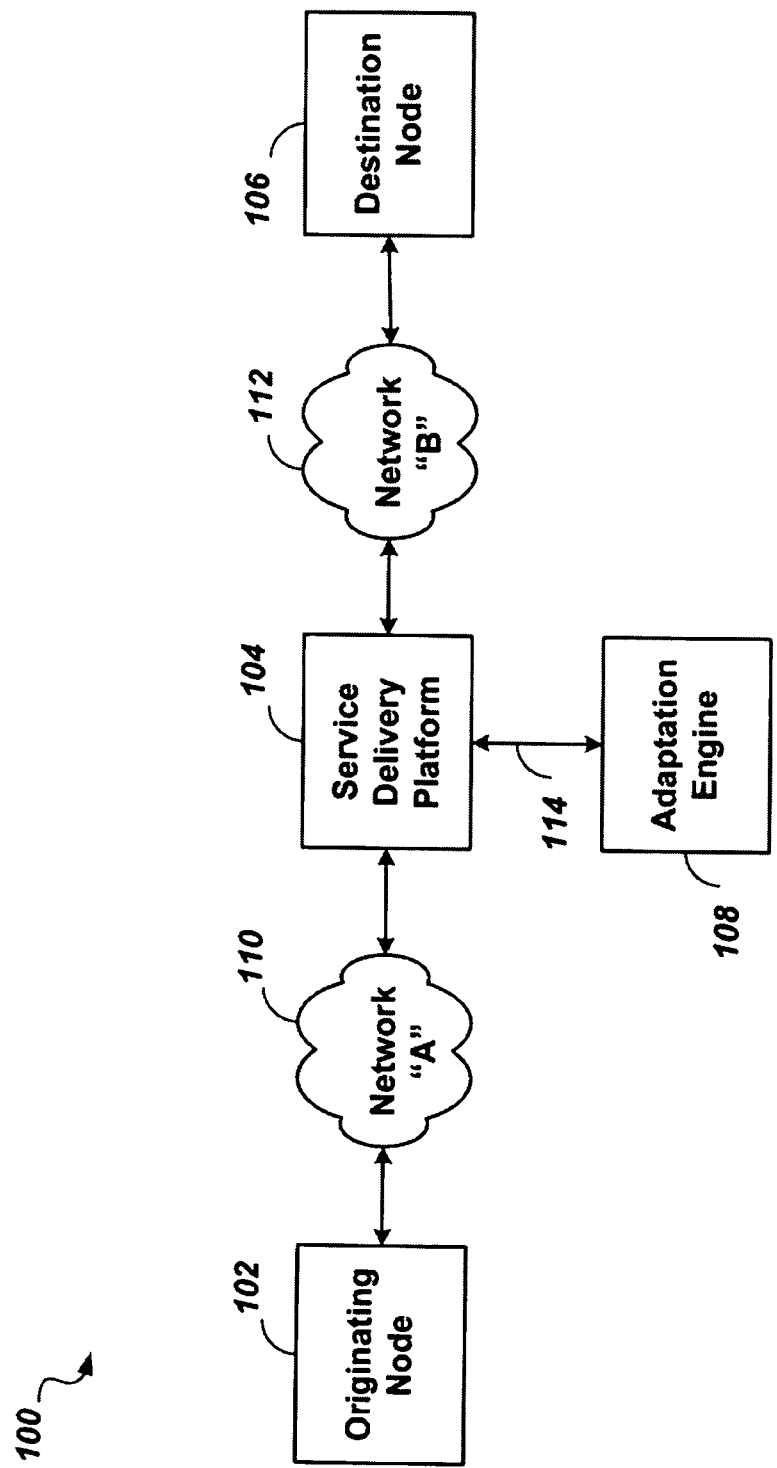
FIG. 1 illustrates one example of an MMS system architecture 100 of the prior art.

The input MMS message 202 is transformed and adapted into the single output audio/video media 204 with an adaptation method 224 that may be executed by innovative software loaded into the adaptation engine 108 (see FIG. 1).

While the example input MMS message 202 may be a standard MMS message according to the OMA Multimedia Messaging Service specification, Approved Version 1.2 May 2005 cited above, and the single output audio/video media 204 may be a media file according to an established format, it is the innovative adaptation method 224 which permits the transformation or adaptation of MMS messages into the single media format.

The "MMS header" 206 provides general information concerning the input MMS message 202 such as the originator of the message, the destination of the message, as well as details about the data that the message contains. The MMS header 206 also identifies the presence of a presentation in the message, in this example the "presentation" 208.

Generally speaking, the information contained in the "presentation" 208 includes a recipe for presenting the message content (the individual "media") in the destination device. In the present example, the "presentation" 208 proposes the following sequence:
play the "audio/video media" 210 first,
then
play the "image media" 212, the "audio media" 214, and the "text media" 216 in parallel.

The example presentation 208 will be described in more detail below (see FIG. 3).

The "audio/video media" 210, the "image media" 212, the "audio media" 214, and the "text media" 216 may be data blocks containing respectively; coded data representing a video clip (with sound); a still image; an audio clip; and text to be displayed. The message may contains these "media" physically, or it may contain references to the actual data blocks to be obtained physically when required by the adaptation engine (108) that executes the adaptation method 224.

The input MMS message 202 that is illustrated in FIG. 2 is merely an example, showing one instance of each type of "single media", for the purpose of describing the innovative adaptation method 224 which adapts the input MMS message 202 into the single output audio/video media 204. In practice, MMS messages of lower or higher complexity may also be adapted into a single audio/video media.

When an MMS message is sent from an originating device (for example the originating node 102, see FIG. 1) to a destination device (the destination node 106), the message is first created using the capabilities of the originating device. This device may not have the means of determining what the capabilities of the destination device are.

An entity, which manages this type of traffic (for example, the Service Delivery Platform 104), has the ability to identify the destination device to which the MMS message is addressed. It may have the ability to query that device for its capabilities. If the content of an MMS message does not match the capabilities of the destination device then an adaptation is required. If both sending and receiving devices are capable of handling MMS messages, the result of the adaptation is normally also an MMS message but with its content (the media contained in it) having been changed by the adaptation to a format suitable for the destination device.

The present invention is concerned with the specific case where an adaptation of an input MMS message is required that results in a single audio/video media output. This is required when the destination device does not have the capability to deal with a MMS message containing several single media, but it does have the capability to deal with one or more audio/video single media formats.

Adaptation of an input MMS message to a single output audio/video media has several high level steps:
  parsing of the input MMS message;
  parsing of the input presentation. If none exists a default presentation is created from the parameters of the media;
  creation of a logical timeline that represents the intent of the presentation as far as how the content of the MMS message should be presented to the destination (i.e. the device that wants to play back the message);
  perform adaptations necessary to generate a single output audio/video media that respects the logical timeline.

Parsing of an input MMS message (e.g. the input MMS message 202, see FIG. 2) requires breaking down the message into sub-components, (in the present example, that includes: the MMS header 206; the presentation 208; the audio/video media 210 including its audio part 210a and video part 210v; the image media 212; the audio media 214; and the text media 216). Each sub-component corresponds to one of the media contained in the MMS message. The end result of the message parsing step is an abstract data structure (that may be stored in computer memory, for example) representing the structure of the MMS message.

Presentation

As mentioned earlier, the presentation 208 that may be included in an MMS message (e.g. the input MMS message 202) includes a set of instructions which may be considered to be a recipe for presenting the message content (the "media") in the destination device. The adaptation method 224 makes use of the information found in the presentation 208 to drive the adaptation process.

The presentation 208 is coded in the Synchronized Media Integration Language (SMIL) markup language described in Synchronized Multimedia Integration Language (SMIL) 2.0 Specification W3C Recommendation 7 Jan. 2001, available at the following URL http://www.w3.org/TR/smil20/.

FIG. 3 shows a SMIL code segment that would correspond to the presentation 208, as an example.

The presentation 208 comprises 19 lines of SMIL code. Line 01 identifies the code as SMIL code. A header (lines 02 to line 08) includes screen layout specifications for an "Image" region (line 05) and a "Text" region (line 06). A "body" of the presentation (lines 09 to 18) contains media specifications within "par" (parallel paragraphs) blocks.

The first "par" block (lines 10 to 12) specifies a duration of 8000 milliseconds (line 10) during which a named video source ("video1.3gp") is to be played in the "Image" region, from a time 0 to a time 8000 milliseconds (line 11).

The second "par" block (lines 13 to 17) specifies a duration of 6000 milliseconds (line 13) during which three media are to be presented:

a named audio source ("audio1.aac") from a time 0 to a time 6000 milliseconds (line 14);
  a named image source ("image1.jpg") from a time 0 to a time 3000 milliseconds (line 15); and
  a named text source ("text1.txt") from a time 3000 to a time 6000 milliseconds (line 16).

The presentation 208 is a simple example, in order to illustrate the basic concept of the innovative adaptation method 224. More complex presentations may be constructed and the SMIL language includes numerous additional keywords that may be used to specify presentation elements. Without going into particulars here, it is intended that the adaptation method 224 will either implement all features that may be specified in the presentation of a MMS message, or provide a default behavior.

Figure 4:
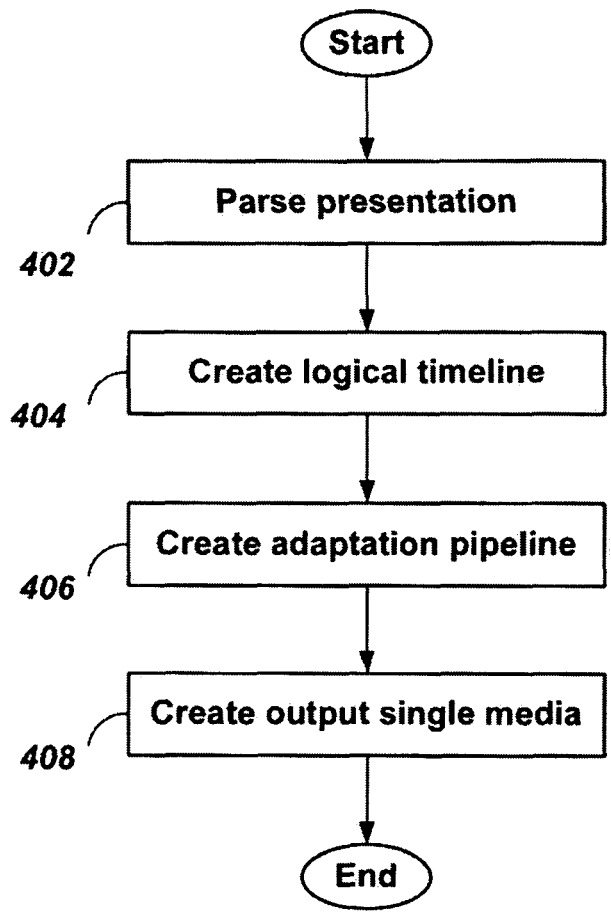
FIG. 4 is a flow chart of steps of the adaptation method 224.

FIG. 4 is a flow chart of steps of the adaptation method 224, including steps:
  402 "Parse Presentation";
  404 "Create logical timeline";
  406 "Create adaptation pipeline"; and
  408 "Create output single media".

If a presentation (such as the presentation 208) is present in the input MMS message then this presentation is used. If no presentation is present then a default presentation is created that simply presents all the single media of the input MMS message sequentially for their entire duration.

Using the information in the presentation, it is possible to identify the order and timing of the media that should be played. In the present example, the consecutive "par" blocks are identified in the SMIL code of the presentation 208 (lines 10 to 17, FIG. 3) which yield information about how the media they refer to should be "played back".

In the step 402 "Parse Presentation", this information in the presentation 208 is broken down into components that represent the times and durations of each of the single media of the input MMS message.

Figure 5:
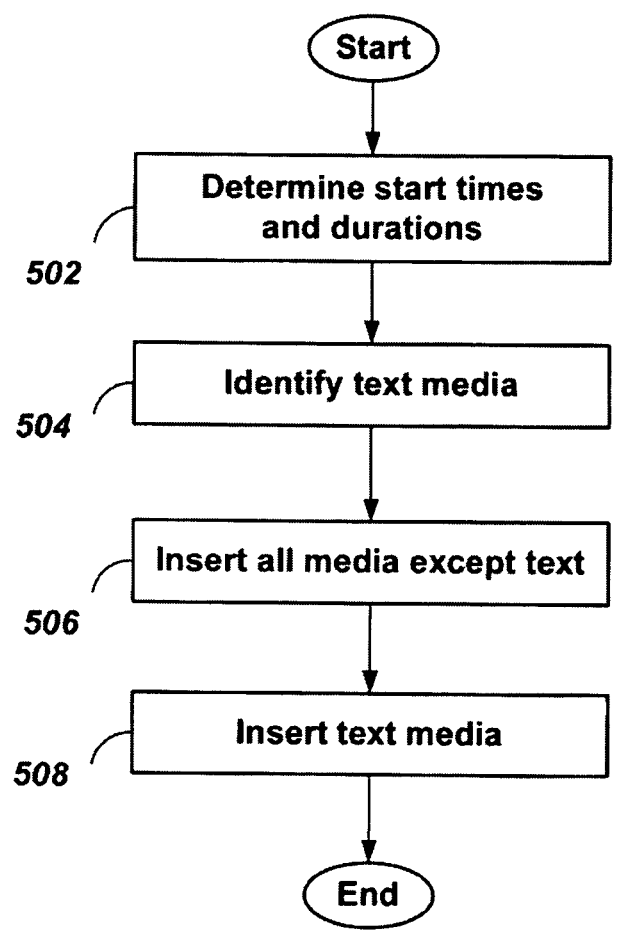
FIG. 5 shows an expanded flow chart of the step 404 "Create Logical timeline" of the adaptation method 224.

FIG. 5 shows an expanded flow chart of the step 404 "Create Logical timeline" in which a logical timeline is created, comprising the following (sub)-steps:
  502 "Determine start times and durations";
  504 "Identify text media";
  506 "Insert all media except text"; and
  508 "Insert text media".

To create the logical timeline, the presentation is inspected in the step 502 "Determine total duration" to determine the start time and duration of each single media it refers to, thus creating an empty timeline of sufficient duration.

Note that the ultimate goal of the adaptation is a single audio/video media. In the next step 504 "Identify text media", and before proceeding with insertion of any media in the logical timeline, the presentation is analyzed to identify the presence of any text media. This is done so that empty video may be inserted where required in the event that no video/image is present in the input MMS message. This permits the text to be added to the output audio/video single media in the form of a text overlay. Note that a video text overlay requires the presence of video.

In the next step 506 "Insert all media except text" all audio, image, and video media are inserted on the logical timeline, using the time and duration specifications for each that are found in the presentation. Upon inserting media on the logical timeline, the start time and duration of any single media already inserted, may be adjusted so that they are aligned with one another (start at the same time and have the same duration). Such adjustments may be necessary to ensure that no media overlaps more than one other media. This is done to make it possible to perform the requested adaptation as a set of individual adaptations with the least amount of mutual dependency, and to be able to insert silences (empty audio) and/or empty video frames (empty video) if necessary.

Initially, all audio, image and video single media found in the input MMS message are thus inserted in the logical timeline.

In the final step 508 "Insert text media", the insertion of any text media that may be present, completes the logical timeline creation.

The resulting logical timeline is an ordered sequence of single media sets, each single media set comprising a concurrent set of at most one of each type from the following: an audio, an image or video, and optionally a text segment. A "single media set" may also be loosely termed an "input media" of the containing input MMS message.

Figure 6:
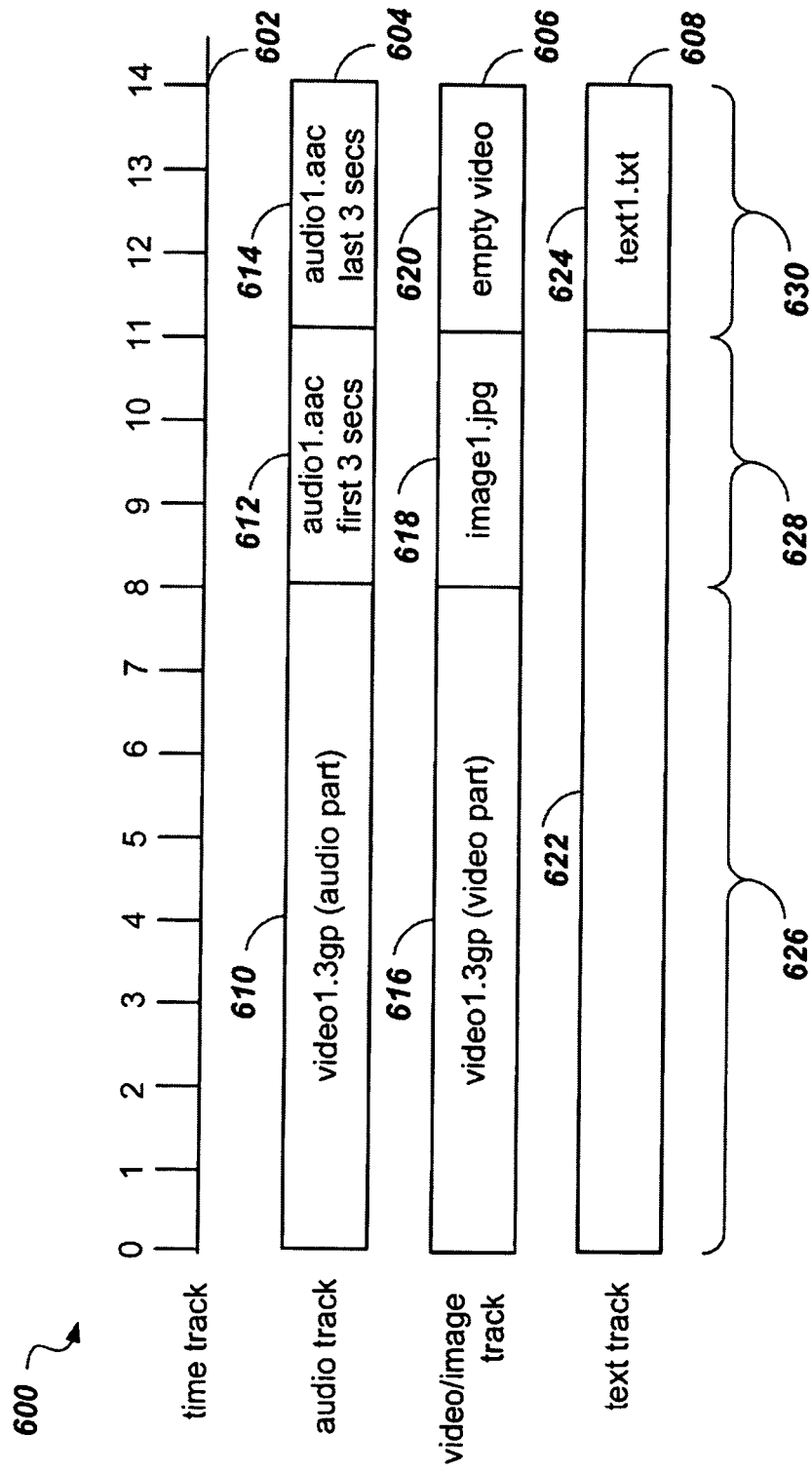
FIG. 6 shows a completed example logical timeline 600 that corresponds to the example presentation 208 of FIG. 3.

FIG. 6 shows a completed example logical timeline 600 that corresponds to the example presentation 208 (FIG. 3). The scale of the logical timeline 600 is provided through a time track 602 marked in seconds. The logical timeline 600 then comprises an audio track 604, a video/image track 606, and a text track 608.

The audio track 604 has a total duration of 14 seconds, and comprises three segments: a "video1.3gp (audio part)" segment 610 of 8 seconds duration, an "audio1.aac first 3 secs" segment 612 of 3 seconds duration, and an "audio1.aac last 3 secs" segment 614 of 3 seconds duration.

The video/image track 606 also has a total duration of 14 seconds, and comprises three segments: a "video1.3gp (video part)" segment 616 of 8 seconds duration, an "image1.jpg" segment 618 of 3 seconds duration, and an "empty video" segment 620 of 3 seconds duration. The text track 608 also has a total duration of 14 seconds, and comprises two segments: a blank segment 622 of 11 seconds duration, and a "text1.txt" segment 624 of 3 seconds duration.

In terms of single media sets, the example logical timeline 600 includes three single media sets (SMS)
- a first (8 seconds) SMS 626, comprising the "video1.3gp (audio part)" segment 610 and the "video1.3gp (video part)" segment 616 of 8 seconds;
- a second (3 seconds) SMS 628, comprising the "audio1.aac first 3 secs" segment 612 and the "image1.jpg" segment 618 of 3 seconds; and
- a third (3 second) SMS 630, comprising the "audio1.aac last 3 secs" segment 614, the "empty video" segment 620 of 3 seconds, and the "text1.txt" segment 624 also of 3 seconds.

The example logical timeline 600 was created in the step 404 "Create Logical timeline" from the information contained in the example presentation 208 (FIG. 3) by executing the (sub)-steps 502 to 508 (FIG. 5):

In the step 502 "Determine start times and durations", the duration of the example time track 602 is determined from lines 10 (dur=8,000 ms) and 13 (dur=6,000 ms) of the example presentation 208 to be at least 14,000 ms (=14 seconds) long.

In the step 504 "Identify text media", the reference to the text media "text1.txt" is found in the example presentation 208 in line 16.

In the step 506 "Insert all media except text", the following audio items are inserted in the audio track 604 of the example logical timeline 600:
- the audio part of the audio/video media "video1.3gp", lasting 8 seconds (see the example presentation 208, line 11), is inserted in the time range 0 to 8 seconds, as "video1.3gp (audio part)" 610;
- then the audio media block "audio1.aac", lasting 6 seconds (see the example presentation 208, line 14), is inserted in the time ranges 8 to 11 and 11 to 14 seconds, as "audio1.aac first 3 secs" 612 and "audio1.aac last 3 secs" 614.

Note that the 6-second audio media block "audio1.aac" is broken up into two 3-second parts so as to be aligned with the image and empty video media, to facilitate combining the audio and video tracks into a single audio/video media later (see below).

Continuing in the step 506 "Insert all media except text", the following video/image items are inserted in the video/image track 606 of the example logical timeline 600:
- the video part of the audio/video media "video1.3gp" lasting 8 seconds (see the example presentation 208, line 14), is inserted in the time range 0 to 8 seconds, as "video1.3gp (video part)" 616;
- then the image media "image1.jpg" lasting 3 seconds (see the example presentation 208, line 15), is inserted in the time range 8 to 11 seconds, as "image1.jpg" 618.

Because the audio track is 14 seconds long, and the goal (as explained earlier) is to create a single audio/video media, it will be necessary to also fill a 14-seconds video track. But no video or image beyond 11 seconds is contained in the example presentation 208. For this reason, the "empty video" block 620 is inserted in the example logical timeline 600 in the time range 11 to 14 seconds.

Finally, in the step 508 "Insert text media", the text media "text1.txt" lasting 3 seconds (see the example presentation 208, line 16), is inserted in the text track in the time range 8 to 11 seconds, as "text1.txt" 618.

The adaptation method 224 should not be construed to be limited to the simple example presentation 208 and the corresponding example logical timeline 600 which are presented only to facilitate easier understanding of the invention.

Before describing details of the step 406 "Create adaptation pipeline" in which an adaptation pipeline is created, the concept of the adaptation pipeline is briefly explained.

The adaptation pipeline comprises a series of instructions where each instruction has three components:
- input identifiers (referenced media);
- operation;
- output identifier.

In the final step 408 "Create output single media" of the adaptation method 224, the series of instructions of the dynamically constructed adaptation pipeline are then simply executed in a computer that may be programmed to execute these instructions.

Figure 7:
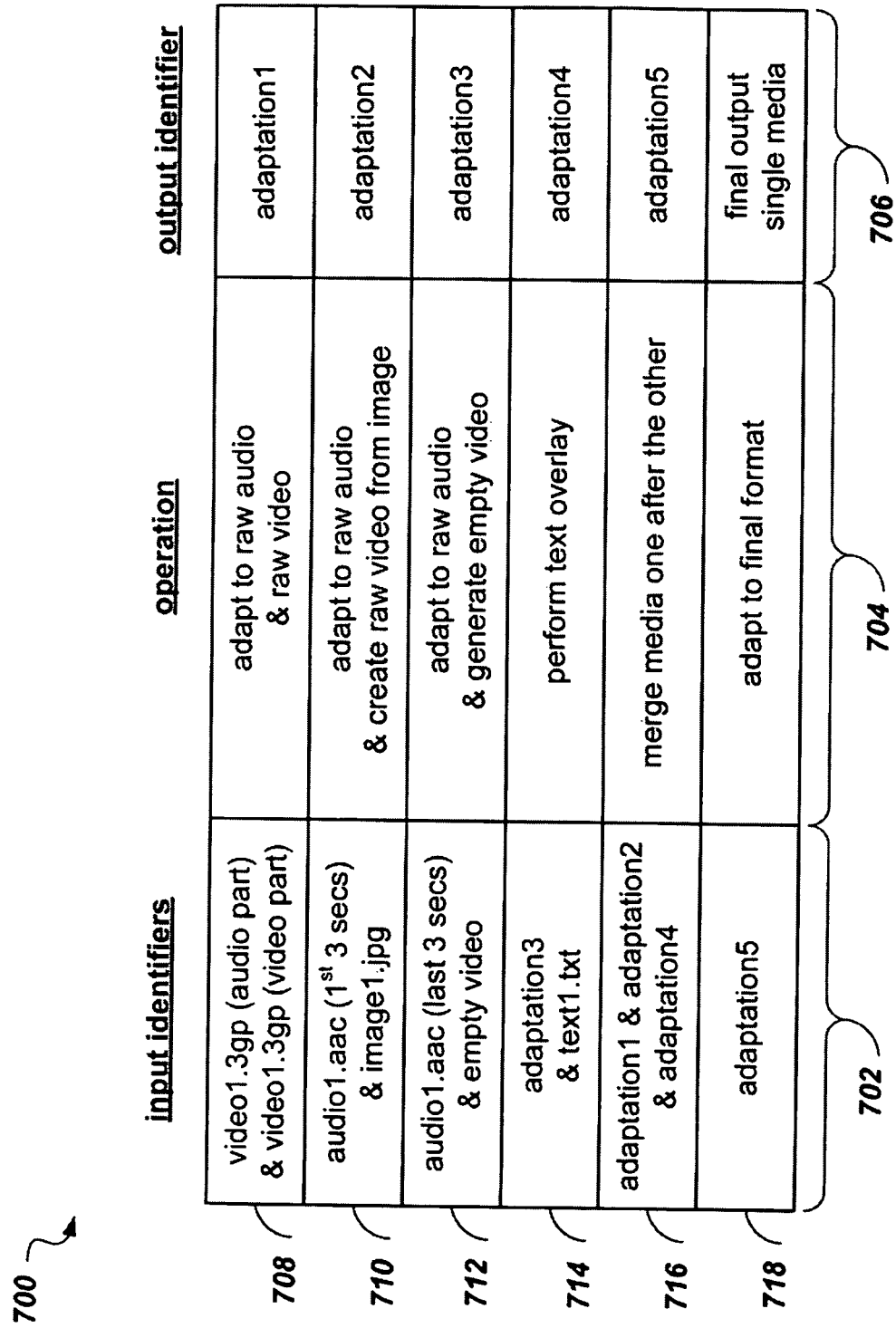
FIG. 7 shows an example adaptation pipeline 700, derived from the example logical timeline 600.

FIG. 7 shows an example adaptation pipeline 700 that is derived from the example logical timeline 600.

The example adaptation pipeline 700 is shown with instruction fields arranged in columns: a "input identifiers" field 702; an "operation" field 704; and an "output identifier" field 706.

An instruction is defined by the entries in the instruction fields wherein the "operation" field 704 indicates an adaptation operation to be performed on the media whose reference is indicated in the "input identifiers" field 702, the operation resulting in a respective destination output media result whose reference name is contained in the "output identifier" field 706.

In the example adaptation pipeline 700, a first set of instructions (708, 710, and 712) include input identifiers (column 702) that are directly copied from the example logical timeline 600:
- instruction 708: "video1.3gp (audio part) & video1.3gp (video part)" (610 and 616);
- instruction 710: "audio1.aac first 3 secs" & image1.jpg" (612 and 618); and instruction 712: "audio1.aac last 3 secs" & empty video" (614 and 620).

The adaptation operations (column 704) of these instructions are listed as:

instruction 708: "adapt to raw audio & raw video";

instruction 710: "adapt to raw audio & create raw video from image"; and instruction 712: "adapt to raw audio & generate empty video".

The outputs generated by these adaptation operations are given distinct arbitrary output identifiers (column 706), i.e.:

instruction 708: "adaptation1";

instruction 710: "adaptation2"; and instruction 712: "adaptation3".

The fourth instruction 714 of the example adaptation pipeline 700 includes:

input identifiers (column 702) "adaptation 3 & text1.txt" (624);

adaptation operation (column 704) "perform text overlay"; and output identifier (column 706) "adaptation4".

The first three adaptation instructions (708-712) of the example adaptation pipeline 700 follow the example logical timeline 600, by using as input identifiers successively referenced media in the logical timeline, and adapting the input media into a common form (raw audio and raw video) as required. This includes, in general terms, "exploding" compressed or coded audio and video files (for example .3gp audio and video formats, .aac formats), creating raw video from still images (.jpg format), and creating empty video in preparation for insertion of a text overlay.

The function of the fourth adaptation instruction (714) is to perform the text overlay by combining the output of the previous instruction ("adaptation3") with the "text1.txt" 624 media that was referenced in the example logical timeline 600. In other words, the fourth instruction (714) takes the "adaption3" which contains only audio and an empty video clip, and "paints" (adds a transparent layer containing the painted text) the text from "text1.txt" 624 onto the video.

Even though it is not present in this example it is however possible to perform text overlay over any video. It does not have to be empty video.

The fifth adaptation instruction 716 of the example adaptation pipeline 700 includes:

input identifiers (column 702) "adaptation 1 & adaptation2 & adaptation4";

adaptation operation (column 704) "merge media one after the other"; and output identifier (column 706) "adaptation5".

This fifth adaptation instruction 716 merely concatenates the previously generated media ("adaptation1", "adaptation2", and "adaptation4") into a single media named "adaptation5". The "adaptation3" is not included since it has been effectively replaced with the "adaptation4" that includes the text overlay in the video part.

The final adaptation operation "adapt to final format" in the last instruction (718) of the example adaptation pipeline 700 is used to generate a formatted single audio/video media "final output single media" from the (raw) "adaptation5". The "final output single media" is designed to match the capabilities of the destination node (e.g. the destination node 106, FIG. 1) that is to receive the adapted message.

The example adaptation pipeline 700 has been described with certain input media formats (.3gp, .aac, .jpg, and .txt) in order to demonstrate a realistic example. This example should not be construed as limiting the invention to the adaptation of these formats, on the contrary, it is the explicit objective of the invention to accommodate any and all formats of media which may be carried in the media of a MMS message, and adapt and merge these into a single media, for example a single audio/video media, encoded in any practical format that may be required by the destination node.

After the description of an example of an adaptation pipeline (the example adaptation pipeline 700), we turn now to a general description of the step 406 "Create adaptation pipeline" of the adaptation method 224 (FIG. 4).

Figure 8:
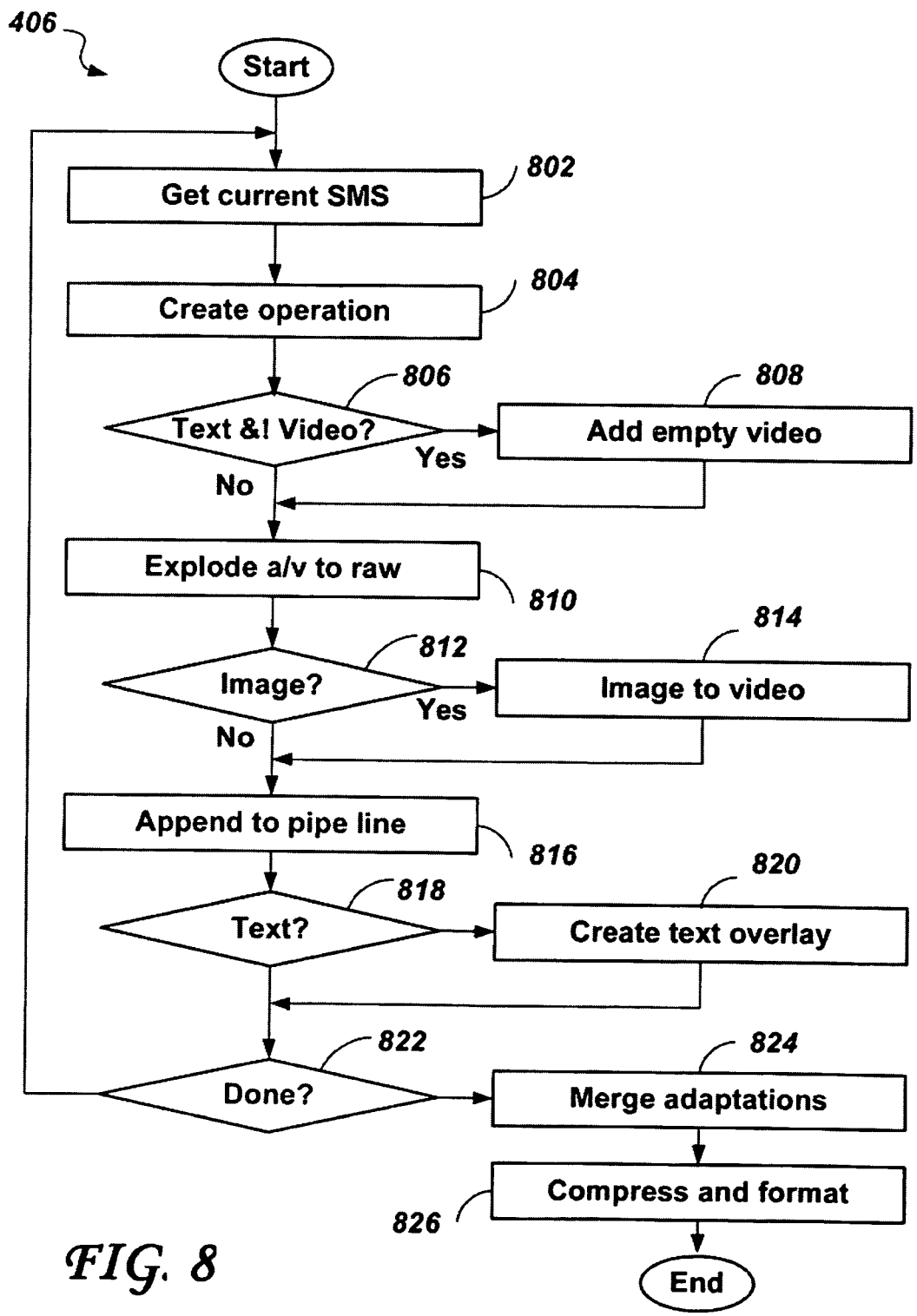
FIG. 8 shows an expanded flow chart of the step 406 "Create adaptation pipeline" of the adaptation method 224.

FIG. 8 shows an expanded flow chart of the step 406 "Create adaptation pipeline", including steps:

802 "Get current SMS";

804 "Create operation";

806 "Text &! Video?";

808 "Add empty video";

810 "Explode a/v to raw";

812 "Image?";

814 "Image to video";

816 "append to pipeline";

818 "Text?";

820 "Create text overlay";

822 "Done?";

824 Merge adaptations"; and

826 "Compress and format".

Using the logical timeline (e.g. the example logical timeline 600), the step 406 "Create adaptation pipeline" creates a sequence of individual adaptations that, together, form an adaptation pipeline. As described above, the adaptation pipeline is composed of adaptation instructions which include the operations required to lead to the final result which is an output single media. After the adaptation pipeline is created, the adaptation instructions it contains are executed sequentially in the step 408 "Create output single media" (see below).

The steps (802 to 820) form a sequence of steps for processing one SMS of the logical timeline into a corresponding one or more adaptation instructions of the adaptation pipeline. This sequence is executed until the step 824 "Done" indicates that all single media sets have been processed.

In the step 802 "Get current SMS", the first single media set is taken from the logical timeline in the first iteration of the loop; the next SMS is taken in subsequent iterations.

In the step 804 "Create operation", an adaptation operation is created with the current SMS. This adaptation operation does not contain any text yet; if text is present in the current SMS it will be dealt with later.

In the step 806 "Text&!ImageVideo?" ("text and no videoimage") it is determined if text is present in the current SMS, but not video. If no text is present or video is present ("No" from 806), execution continues with the step 810. If text is present in the current SMS but no video ("Yes" from 806) then the step 808 "Add empty video" is executed in which an operation to add empty video is added as part of the current adaptation operation.

With the next step 810 "Explode a/v to raw", the adaptation operation is added that will create an output single media that has raw audio and/or video (audio and/or video that is in an uncompressed form).

In the next step 812 "Image?" it is determined if a still image is present in the current SMS.

If an image is found ("Yes" from 812), the step 814 "Image to video" is executed which adds an operation in which the image will be transformed into video by duplicating the image in as many individual frames as are required to form the video part of the duration given in the SMS. If no image is found ("No" from 812), execution continues immediately with the step 816 "Append to pipeline".

In the next step (the step 816 "Append to pipeline") the complete adaptation instruction, that is the current operation as well as the input identifiers (from the SMS of the logical timeline) and an output identifier, is appended to the adaptation pipeline;

Before continuing with the next SMS, a determination is made if text is present in the current SMS, in the step 818 "Text?". If text is present ("Yes from 818) then an additional adaptation instruction is created in the step 820 "Create text overlay" which will create the text overlay. It will use as input identifiers the current text media and the single media output resulting from the previous adaptation operation, and create another adaptation output. This additional adaptation instruction is also appended to the adaptation pipeline.

The result of executing the steps 802 to 820 is a set of one or more adaptation instructions that represents the single media contained in one SMS of the logical timeline. When executed, this adaptation will result in an intermediate output single media which contains uncompressed audio and/or video (and possibly text overlay).

In the step 822 "Done?", it is determined if all SMSs of the logical timeline have been processed. If the current SMS was the last SMS of the logical timeline ("Yes" from 822) then execution continues with the step 824 "Merge adaptations", otherwise ("No" from 822), the execution loops back to the step 802 "Get current SMS" to take the next SMS from the logical timeline, and make it the "current SMS".

In the step 824 "Merge adaptations", an instruction is appended to the adaptation pipeline which will merge all meaningful intermediate single media (resulting from the adaptations already added to the adaptation pipeline in the steps 816 or 820 above into one single media. That single media will represent all the media that were present in the logical timeline, in their uncompressed form while respecting their original timing, order and duration.

The last sub-step of the step 406 "Create adaptation pipeline", is the step 826 "Compress and format", in which an instruction is added to the adaptation pipeline, taking the result of the previous adaptation operation as input, and perform the adaptation to the final output format originally requested. This last instruction will also be responsible for executing any special effects that may be requested.

In the final step 408 "Create output single media" of the adaptation method 224, each adaptation instruction contained in the adaptation pipeline that was created in the previous step 406 "Create adaptation pipeline", is executed sequentially. The result of this execution is an output single media that represents the original MMS content in the requested output format.

Computer program code for performing the steps of the methods described above is stored in a computer readable medium such as a semiconductor memory, flash memory, CD and DVD, which when executed, performs the steps of the methods described above.

Figure 9:
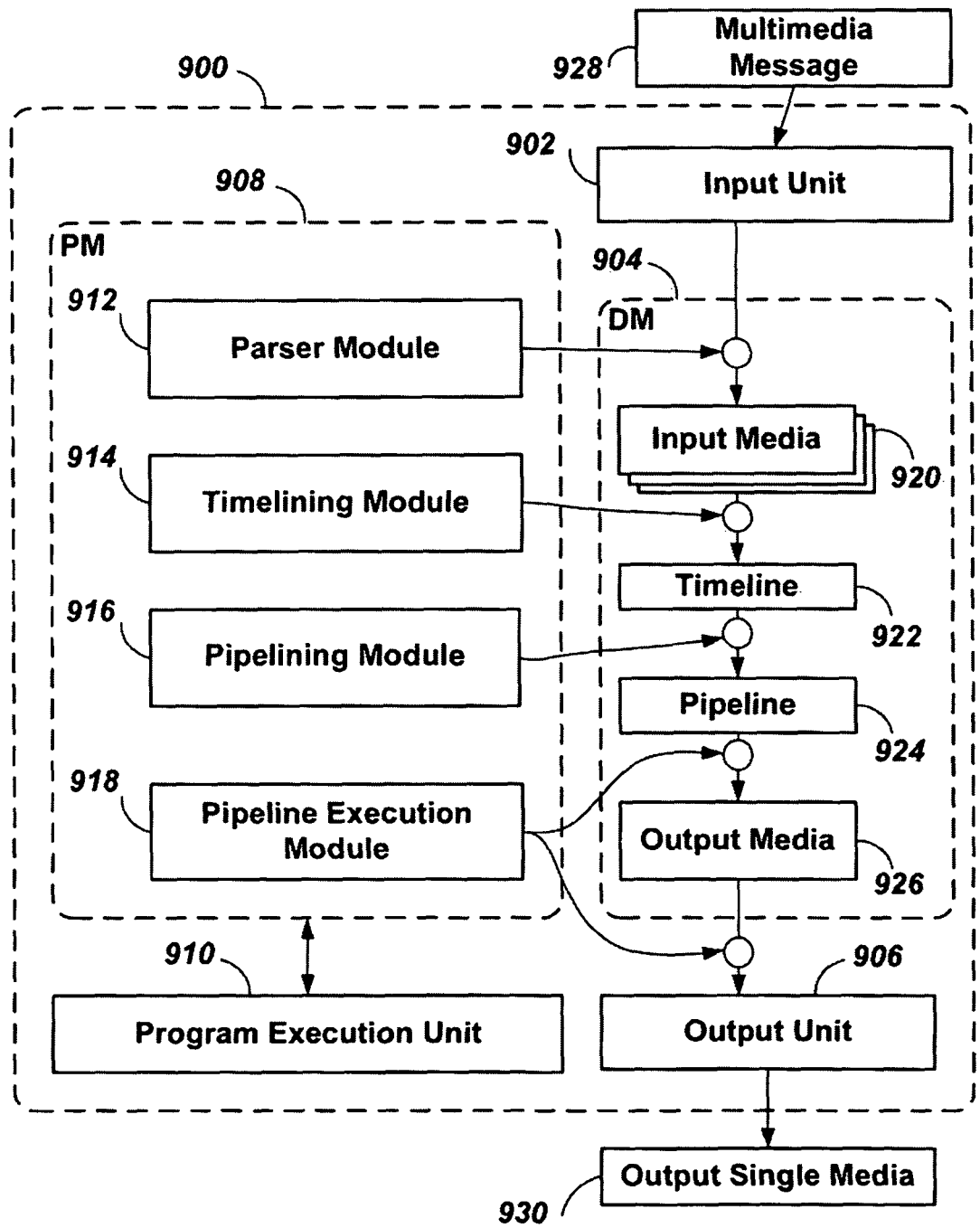
FIG. 9 shows an improved media adaptation system 900 according to the preferred embodiment of the invention.

FIG. 9 shows an improved media adaptation system 900 according to the embodiment of the invention. The improved media adaptation system 900 includes an Input Module 902; a Data Memory (DM) 904; an Output Unit 906; a Program Memory (PM) 908; and a Program Execution Unit 910. The improved media adaptation system 900 may be conveniently implemented in a general purpose or specialized computer having a CPU and memory, where a computer program code is stored, and executed under any of a number of well known operating systems such as Linux, Mac OSX, UNIX, or Windows. The modules of the system 900 may comprise a firmware or alternatively a computer software code stored in a computer readable medium such as a semiconductor memory, flash memory, CD and DVD.

The Program Memory 908 includes computer programs stored in computer memory, conveniently grouped in the following modules: a Parser Module 912; a Timelining Module 914; a Pipelining Module 916; and a Pipeline Execution Module 918. The Program Memory 908 may also include other computer program modules (not shown) for setting up, running, and maintaining the improved media adaptation system 900.

The Data Memory 904 includes storage for a plurality of input media 920; a logical timeline 922; an adaptation pipeline 924; and an output media 926. The Data Memory 904 may further include other data (not shown) for facilitating the operation of the media adaptation system 900, including look-up tables, temporary variables etc.

The purpose of the media adaptation system 900 is to adapt a multimedia message 928 into an Output Single Media 930.

In operation, the media adaptation system 900 receives the multimedia message 928 through its Input Module 902 into the Data Memory 904. The media adaptation system 900 processes the multimedia message 928 using the program modules stored in the Program Memory 908 and executed by the Program Execution Unit 910. The media adaptation system 900 delivers the Output Single Media 930 through the Output Unit 906.

In FIG. 9, the adaptation is shown symbolically through data flow lines:
  from the multimedia message 928 to the Input Unit 902;
  from the Input Unit 902 to the plurality of input media 920;
  from the plurality of input media 920 to the logical timeline 922;
  from the logical timeline 922 to the adaptation pipeline 924;
  from the adaptation pipeline 924 to the output media 926;
  from the output media 926 to the Output Unit 906; and
  from the Output Unit 906 to the Output Single Media 930.

Arrows from each of the program modules (912 to 918) to function points (circles) on the data flow lines indicate the actions performed by each of the program modules (912 to 918) in processing data, corresponding to the steps of the adaptation method shown in FIG. 4 above:
  the Parser Module 912 performs the step 402 "Parse Presentation" (see FIG. 4) in which the multimedia message (928) that had been received through the Input Unit 902, is parsed and the plurality of Input Media 920 is delivered into the Data Memory 904 to be stored;
  the Timelining Module 914 performs the step 404 "Create logical timeline" in which the logical timeline is created (see FIG. 5) as an ordered sequence of the plurality of input media 920, and stored as the Logical Timeline 922 in the Data Memory 904, see also the description of the example logical timeline 600 (FIG. 6) above;
  the Pipelining Module 916 performs the step 406 "Create adaptation pipeline" in which a pipeline of adaptation instruction is derived from the Logical Timeline 922, and stored as the Adaptation Pipeline 924 in the Data Memory 904, see also the description of the example adaptation pipeline 700; and
  the Pipeline Execution Module 918 performs the step 408 "Create output single media" by sequentially executing the adaptation instructions of the Adaptation Pipeline 924, and storing the resulting Output Media 926 (which may correspond to the result of the second last adaptation step 716 of the example adaptation pipeline 700, FIG. 7) in the Data Memory 904.

The Output Media 926 is preferably formatted in the desired final format (the step corresponding to the last adaptation step 718 of the example adaptation pipeline 700, FIG. 7, as the Output Single Media 930 and delivered through the Output Unit 906.

Although the embodiment of the invention has been described in detail, it will be apparent to one skilled in the art that variations and modifications to the embodiment may be made within the scope of the following claims.

What is claimed is:

1. A method for adapting a multimedia message, comprising at least two input media into an output single media, the method comprising steps to be executed in sequence:
   (a) identifying specifications for said at least two input media by parsing a presentation media of the multimedia message, the specifications comprising instructions how to present said at least two input media;
   (b) creating a logical timeline from the parsed presentation, comprising arranging said at least two input media in order in accordance with the specifications, comprising:
      (i) determining a start time and duration of each said at least two input media:
      (ii) identifying presence of any text media in the plurality of input media;
      (iii) inserting all input media except the text media into the logical timeline; and
      (iv) inserting the text media into the logical timeline after the step (iii);
   (c) creating an adaptation pipeline from the logical timeline, comprising defining adaptation instruction steps following the order of the logical timeline; and
   (d) executing the adaptation pipeline, comprising executing the adaptation instruction steps upon said at least two input media to create the output single media.

2. The method of claim 1, wherein said specifications comprise respective times and durations of each said at least two input media.

3. The method of any one of claim 1, wherein the step (b) further comprises adjusting start times for some of said at least two input media.

4. The method of claim 1, wherein each of the adaptation instruction steps further comprises:
   defining one or more input media of said at least two input media for transcoding;
   defining a transcoding operation for the one or more input media using a set of transcoding parameters; and
   defining a respective destination output media for the result of the transcoding operation.

5. The method of claim 4, wherein the step (d) further comprises merging the respective destination output media into the output single media.

6. The method of claim 1, wherein the output single media is one of the following:
   an audio file including an audio stream;
   a video file including a video stream; or
   a combined audio and video file including audio and video streams.

7. The method of claim 6, wherein the step (d) further comprises:
   converting a text media of said at least two input media into a graphical representation; and
   overlaying the graphical representation over the video stream of the video file or the combined audio and video file respectively.

8. The method of claim 6, wherein the step (d) further comprises:
   converting an image media of the plurality of input media into a video representation; and
   inserting the video representation into the video stream of the video file or the combined audio and video file respectively.

9. The method of claim 1, wherein the multimedia message is a multimedia messaging service (MMS) message.

10. A media adaptation system for adapting a multimedia message including a plurality of input media, into a single output media, the system comprising:
    a processor; and
    a computer memory having computer readable instructions stored thereon for execution by the processor, the processor being configured to identify specifications for said plurality of input media by parsing a presentation media of the multimedia message, the specifications comprising instructions how to present the plurality of input media, and to form:
    a timelining module for creating a logical timeline of the input media from the parsed presentation, comprising arranging said plurality of input media in order in accordance with the specifications, wherein the timelining module is further configured to:
      (i) determine a start time and duration of each input media;
      (ii) identify presence of any text media in the plurality of input media;
      (iii) insert all input media except the text media into the logical timeline; and
      (iv) insert the text media into the logical timeline after all other input media have been inserted;
    a pipelining module for creating an adaptation pipeline from the logical timeline, comprising defining adaptation steps following the order of the logical timeline; and
    a pipeline execution module for executing said adaptation instruction steps upon the plurality of input media to create the output single media.

11. The system of claim 10, wherein the specifications comprise respective times and durations of each of said plurality of input media.

12. The system of claim 10, wherein the timelining module is further configured to adjust start times for some of said plurality of input media.

13. The system of claim 10, wherein the pipelining module is further configured to:
    define one or more input media of said at least two input media for transcoding;
    define a transcoding operation for the one or more input media using a set of transcoding parameters; and
    define a respective destination output media for the result of the transcoding operation.

14. The system of claim 13, wherein the pipeline execution module is further configured to merge the respective destination output media into the output single media.

15. The system of claim 10, wherein the output single media is one of the following:
    an audio file including an audio stream;
    a video file including a video stream; or
    a combined audio and video file including audio and video streams.

16. The system of claim 15, wherein the pipeline execution module is further configured to:
    convert a text media of said at least two input media into a graphical representation; and overlay the graphical representation over the video stream of the video file or the combined audio and video file respectively.

17. The system of claim 15, wherein the pipeline execution module is further configured to:
convert an image media of the plurality of input media into a video representation; and
insert the video representation into the video stream of the video file or the combined audio and video file respectively.

18. The system of claim 10, wherein the multimedia message is a multimedia messaging service (MMS) message.

19. A media adaptation system, comprising:
at least one hardware processor;
a non-transitory computer readable storage medium having computer readable instructions stored thereon for execution by the processor, causing the processor to:
adapt at least two input media contained in a multimedia messaging service (MMS) message including a presentation, into an output single media, comprising:
(a) identifying specifications for said at least two input media by parsing the presentation, the specifications comprising instructions how to present said at least two input media;
(b) creating a logical timeline from the parsed presentation, comprising arranging said at least two input media in order in accordance with the specifications, comprising:
(i) determining a start time and duration of each input media;
(ii) identifying presence of any text media in the plurality of input media;
(iii) inserting all input media except the text media into the logical timeline; and
(iv) inserting the text media into the logical timeline after all other input media have been inserted;
(c) creating an adaptation pipeline from the logical timeline, comprising defining adaptation instruction steps following the order of the logical timeline; and
(d) executing the adaptation pipeline, comprising executing the adaptation instruction steps upon said at least two input media to create the output single media.

20. The system of claim 19, wherein the specifications comprise respective times and durations of each of said plurality of input media.

21. The system of claim 19, wherein the at least one hardware processor is further configured to adjust start times for some of said plurality of input media.

22. The system of claim 19, wherein the at least one hardware processor is further configured to:
define one or more input media of said at least two input media for transcoding;
define a transcoding operation for the one or more input media using a set of transcoding parameters; and
define a respective destination output media for the result of the transcoding operation.

23. The system of claim 22, wherein the at least one hardware processor is further configured to merge the respective destination output media into the output single media.

24. The system of claim 19, wherein the output single media is one of the following:
an audio file including an audio stream;
a video file including a video stream; or
a combined audio and video file including audio and video streams.

25. The system of claim 24, wherein the at least one hardware processor is further configured to:
convert a text media of said at least two input media into a graphical representation; and
overlay the graphical representation over the video stream of the video file or the combined audio and video file respectively.

26. The system of claim 24, wherein the at least one hardware processor is further configured to:
convert an image media of the plurality of input media into a video representation; and
insert the video representation into the video stream of the video file or the combined audio and video file respectively.

27. The system of claim 19, wherein the multimedia message is a multimedia messaging service (MMS) message.

* * * * *